Patented Apr. 15, 1952

2,592,540

UNITED STATES PATENT OFFICE 2,592,540

STABILIZED TETRAETHYLPYROPHOSPHATE INSECTICIDAL DUST

Carroll C. Cassil and Jerome Yaffe, Berkeley, Calif., assignors to Food Machinery and Chemical Corporation, San Jose, Calif.

No Drawing. Application January 12, 1949, Serial No. 70,609

4 Claims. (Cl. 167—22)

The present invention relates to an insecticidal dust and more particularly to a stabilized insecticidal dust containing as active insecticidal ingredients, tetraethyl pyrophosphate dissolved in pine oil as a hydrophobic carrier for the TEPP.

Tetraethyl pyrophosphate appears on the market as a chemical mixture containing about 40% tetraethyl pyrophosphate and about 60% of inactive ingredients which are generally other ethyl phosphates such as, for instance, the product sold under the name "Hexcide".

Tetraethyl pyrophosphate is an effective insecticide and acaracide and is employed to destroy insects, mites and aphids as, for instance, in spraying on apple trees, pear trees, citrous fruits, vegetable crops, such as spinach, cauliflower, cabbage, and the like.

Tetraethyl pyrophosphate is hydrolyzed by water and alkalies and when employed as a water spray the effectiveness of the ingredient for its intended purpose begins at a maximum and then declines as the hydrolysis proceeds. Thus, in water, it possesses a half life of about eight hours.

It is an object of the present invention to provide a more effective formulation for the employment of tetraethyl pyrophosphate, particularly in dust formulations.

It is a further object of the invention to provide a dust formulation wherein the tetraethyl pyrophosphate is protected by inclusion in a hydrophobic liquid carrier with which the tetraethyl pyrophosphate is miscible.

In accordance with the principles of the present invention, tetraethyl pyrophosphate is carried in a dust as an inclusion in a hydrophobic liquid with which it is completely miscible. To this end, the tetraethyl pyrophosphate of the well known 40% grade, such as that referred to above under the trade name "Hexcide," is incorporated first in pine oil and then in the inorganic dust diluent.

In the particular experiments about to be described, the well known and conventional anhydrous calcium sulfate was employed as the diluent since it is relatively non-alkaline in nature and, therefore, would not tend to hydrolyze the ester. The dust formulation comprised 94% of the anhydrous calcium sulfate (0.3% water) and 6% of ester-pin oil mixture, one-half of which was pine oil, the other half the 40% grade of tetraethyl pyrophosphate (60% of inactive ethyl phosphates) sold under the name "Hexcide".

The resulting dust was stored in glass jars and its insecticidal activity was tested at stated intervals for 12 weeks by dusting the same in an environment containing predetermined and controlled quantities of cabbage aphids. Complete kills were obtained by the employment of the samples employed throughout the twelve week period of the test showing that the effective insecticidal activity of the active ingredient tetraethyl pyrophosphate was maintained in the dust throughout the storage period of 12 weeks.

In contrast to this, a blank run at the same time and comprising 97% anhydrous calcium sulfate and 3% of the same 40% tetraethyl pyrophosphate gave complete kills under the same application rate only during the initial runs and the kills fell off in the latter test runs so that at the end of 12 weeks the kills were on the order of 75 to 70% showing that the pine oil acted as a stabilizing material preventing hydrolytic decomposition of the active ethyl ester.

The tests above having been conducted on material stored in glass, a formulation was made to test the resistance to inactivation when stored in plain fiber drums of the type normally employed for shipment of insecticides of this character. A batch was prepared containing 91 parts anhydrous calcium sulfate (0.3% water), 3 parts of diatomaceous earth (3% water), 3% of 40% tetraethyl pyrophosphate (Hexcide grade) and 3% pine oil. The dust, after a period of three months, was tested biologically and was found to be active. A similar formula without pine oil, stored in a similar drum, became commercially inactive after six weeks. In order further to test the activity of mixtures of this type, two samples of dust were prepared, one without pine oil and one with pine oil, their compositions being as follows:

|  | I | II |
|---|---|---|
| Calcium sulfate | 86.5 | 83.5 |
| Diatomite | 10. | 10.0 |
| Pine oil |  | 3.0 |
| 40% TEPP (Hexcide grade) | 3.5 | 3.5 |

These samples were each separately stored in fiber drums and were analyzed chemically for tetraethyl pyrophosphate. The initial concentration of actual tetraethyl pyrophosphate was 1.54%. The concentration of TEPP were then determined weekly with the following results given in Table I, showing per cent of tetraethyl pyrophosphate:

|  | No. I | No. II |
|---|---|---|
| Initially | 1.54 | 1.54 |
| 2nd week | 1.18 | 1.37 |
| 3rd week | 1.13 | 1.39 |
| 4th week | 1.12 | 1.33 |
| 5th week | 1.01 | 1.26 |
| 6th week | 0.895 | 1.15 |
| 7th week | 0.72 | 1.11 |

The above chemical analysis showed unquestionably that the pine oil possessed a definite stabilizing effect upon the tetraethyl pyrophosphate preventing hydrolysis thereof since the concentration of the active ingredient at the end of the 7th week, in the instance protected with pine oil, No. II, was 1.11% as contrasted with 0.72% in that instance, No. I not protected with pine oil, a figure so low that the dust is not considered commercially active, the lower desirable limit being considered to be about 1% of actual tetraethyl pyrophosphate.

Dust formulations of substantially any desired concentration of tetraethyl pyrophosphate can be prepared which have relatively long life providing the tetraethyl pyrophosphate be protected by mixing the same with pine oil and incorporating this mixture into the dust. Furthermore, it is possible to add to the dust chemicals which are biologically active, such as DDT, chlordane, rotenone, benzene hexachloride, dichlordiphenyldichlorethane, methoxy DDT, sulfur and others.

In the illustrations above, the dust diluent has been given as the conventional anhydrous calcium sulfate. It will be understood, however, that where practical and desirable, other dust diluents or fillers normally employed in the formulation of insecticidal dusts, all of inorganic character, may be employed, such as powdered talc, soapstone, diatomaceous earth, clays, aluminum oxide and other well known dust diluents in addition to anhydrous calcium sulfate. In general the inorganic dust diluent will constitute the major ingredient of the formulation and in most instances will be above 80% of the formulation.

The amount of pine oil employed appears not to be too critical and may vary from about 10% of the weight of the technical grade of tetraethyl pyrophosphate (40%) up to several hundred per cent of the weight of this ingredient. However, for most purposes, it will be found most practical to employ from about 50% to 300% by weight of pine oil based on the weight of 40% TEPP, it being merely sufficient to add that quantity of pine oil which will dissolve the technical grade of tetraethyl pyrophosphate employed and protect it against hydrolysis. By pine oil is meant the product sold on the market as pine oil or any of its ingredients which may include pine oil, pinene, terpene and related products, and has a boiling range from about 160 to 250° C.

What is claimed is:

1. An insecticidal dust comprising an inorganic diluent in major amount and as the active ingredient tetraethylpyrophosphate in pine oil in minor amount.

2. An insecticidal dust comprising an inroganic diluent in major amount and as the active ingredient tetraethylpyrophosphate dissolved in pine oil in minor amount.

3. An insecticidal dust comprising a dust diluent of calcium sulfate in major amount and as the active ingredient tetraethylpyrophosphate and pine oil in minor amount.

4. An insecticidal dust comprising a dust diluent of calcium sulfate in major amount and as the active ingredient tetraethylpyrophosphate dissolved in pine oil in minor amount.

CARROLL C. CASSIL.
JEROME YAFFE.

REFERENCES CITED

The following references are of record in the file of this patent:

UNITED STATES PATENTS

| Number | Name | Date |
| --- | --- | --- |
| 789,176 | Smith | May 9, 1905 |
| 1,631,903 | Van der Lande | June 7, 1927 |
| 2,488,590 | Evans et al. | Nov. 22, 1943 |

OTHER REFERENCES

De Ong, J. Econ. Ect., vol. 24, June 1931, pp. 736–743.

Chem. and Engr. News, April 1947, page 1070.

Hall et al., Ind. and Engr. Chem., April 1943, pp. 694–699.

Chem. Abstr., vol. 20, p. 2555 (1926), vol. 30, p. 3570 (1936), vol. 23, page 4293 (1929).